US008079773B2

(12) United States Patent
    Blanton

(10) Patent No.: US 8,079,773 B2
(45) Date of Patent: Dec. 20, 2011

(54) METHODS AND APPARATUS FOR ASSEMBLING COMPOSITE STRUCTURES

(75) Inventor: Lee Alan Blanton, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 11/252,951

(22) Filed: Oct. 18, 2005

(65) Prior Publication Data

US 2007/0086854 A1   Apr. 19, 2007

(51) Int. Cl.
    *F16L 23/00* (2006.01)
(52) U.S. Cl. .......................... 403/335; 403/41; 403/337
(58) Field of Classification Search .................. 403/337, 403/335, 408.1, 41, 24; 285/412, 55, 363; 411/531, 123; 415/214.1, 213.1, 209.3
    See application file for complete search history.

(56) References Cited

U.S. PATENT DOCUMENTS

| | | | |
|---|---|---|---|
| 2,764,266 A | 9/1956 | Haworth | |
| 3,083,863 A | 4/1963 | Sees | |
| 3,188,115 A | 6/1965 | Morrish et al. | |
| 3,214,201 A * | 10/1965 | Fonda | 285/363 |
| 3,235,291 A * | 2/1966 | Jacoby | 285/55 |
| 4,205,927 A * | 6/1980 | Simmons | 403/337 |
| 4,208,774 A | 6/1980 | Voyer et al. | |
| 4,208,777 A | 6/1980 | Walsh et al. | |
| 4,425,080 A | 1/1984 | Stanton et al. | |
| 4,540,389 A * | 9/1985 | Ramsey | 474/257 |
| 4,902,201 A | 2/1990 | Neubert | |
| 5,096,377 A | 3/1992 | Catte et al. | |
| 5,230,540 A | 7/1993 | Lewis et al. | |
| 5,236,303 A | 8/1993 | Fowler | |
| 5,253,875 A | 10/1993 | Gentile | |
| 5,273,393 A | 12/1993 | Jones et al. | |
| 5,333,995 A | 8/1994 | Jacobs et al. | |
| 5,408,826 A | 4/1995 | Stewart et al. | |

(Continued)

FOREIGN PATENT DOCUMENTS

EP           0464050 B1      5/1993

(Continued)

OTHER PUBLICATIONS

European Search Report, Reference No. 179833/11829, dated Feb. 26, 2009, regarding Application No./patent No. 06255266.6-2315/1777377.

(Continued)

*Primary Examiner* — Victor MacArthur
(74) *Attorney, Agent, or Firm* — David J. Clement, Esq.; Armstrong Teasdale LLP

(57) ABSTRACT

A method facilitates assembling a turbine engine casing. A first casing section is positioned radially outward from a turbine engine. The first casing includes a first flange having an outer end portion, an inner end portion, and a body therebetween. At least a portion of the outer end portion has a partial frusto-conical cross-sectional profile. A second casing section including a second flange is positioned adjacent the first casing section such that a mating surface of the second flange is positioned substantially flush against a first flange mating surface. Each respective mating surface is opposite a respective load-bearing surface. A fastener is inserted through an opening in the first and second flanges to couple casing sections together such that a portion of a load-bearing surface extending over the first flange outer end portion facilitates distributing loading induced therein substantially equally across the load bearing surface.

5 Claims, 4 Drawing Sheets

U.S. PATENT DOCUMENTS

| | | | |
|---|---|---|---|
| 5,775,874 A | 7/1998 | Boite et al. | |
| 5,885,056 A | 3/1999 | Goodwin | |
| 5,899,660 A | 5/1999 | Dodd | |
| 6,176,663 B1 | 1/2001 | Nguyen et al. | |
| 6,196,763 B1 * | 3/2001 | Obermeyer | 285/368 |
| 6,299,221 B1 | 10/2001 | Chaniot et al. | |
| 6,467,988 B1 | 10/2002 | Czachor et al. | |
| 6,641,326 B2 | 11/2003 | Schilling et al. | |
| 6,808,364 B2 | 10/2004 | O'Reilly et al. | |
| 6,848,885 B1 | 2/2005 | Maclean | |
| 6,905,305 B2 | 6/2005 | James et al. | |
| 6,962,096 B2 | 11/2005 | Hojyo | |
| 6,969,826 B2 | 11/2005 | Trewiler et al. | |
| 2003/0152455 A1 | 8/2003 | James et al. | |
| 2003/0209220 A1 | 11/2003 | Hojyo | |
| 2005/0224487 A1 | 10/2005 | Trewiler et al. | |

FOREIGN PATENT DOCUMENTS

| | | |
|---|---|---|
| FR | 2787170 A1 | 6/2000 |
| JP | 54039722 U | 3/1979 |
| JP | 55119282 A | 9/1980 |
| JP | 58052387 U | 4/1983 |
| JP | 58174788 A | 10/1983 |
| JP | 62077388 U | 5/1987 |
| JP | 4505957 T | 10/1992 |
| JP | 8215879 A | 8/1996 |
| JP | 953723 A | 2/1997 |
| JP | 996387 A | 4/1997 |
| JP | 2000008651 A | 1/2000 |
| JP | 2001241790 A | 9/2001 |
| JP | 2005120966 A | 5/2005 |
| WO | 9010812 A1 | 9/1990 |

OTHER PUBLICATIONS

Gelbe H., Dubbel-Taschenbuch fur den Maschinenbau—Teil K, 2001 Springer Verlag, Berlin, Germany XP002511776, Komponenten des thermischen Apparatebaus Components of thermal apparatus, p. K8, paragraph 2.7—p. K9; figure 3d, p. K11, paragraph 2.8.4; figures 5d-e.

P. Bottcher: Einfuhrung In Die Din-Normen 1, 6 9. Auflage Kap. 12, 1985, B.G. Teubner Stuttgart, Beuth Verlag Berlin Und Koln, Berlin, XP002511896, Kapitel 12 Kosntruktionsgrundlagen, p. 185; table 185.1.

A Japanese Office Action for co-pending JP Patent Application No. 2006-279753 (3 pages).

* cited by examiner

US 8,079,773 B2

METHODS AND APPARATUS FOR ASSEMBLING COMPOSITE STRUCTURES

BACKGROUND OF THE INVENTION

This invention relates generally to composite structures, and more particularly, to methods and apparatus for assembling gas turbine engines.

Gas turbine engine assemblies typically include an engine casing that extends circumferentially around the turbine engine. At least some known engine casings are fabricated from segmented sections that are coupled together generally axially via flanges extending from the adjoining sections of the casing. Specifically adjacent flanges are coupled together via fasteners which are inserted through parallel flanges extending substantially perpendicularly outward from the casing section. During operation of the engine, vibrational loading induced from the engine to the casing may induce vibrational stresses and loading to the flanges. Over time, continued exposure to the vibrational loading may cause the fasteners to loosen, a condition known as fastener pull out, and/or may lead to premature failure of the flanges.

To facilitate preventing fastener pull out, at least some known engine casings use load-spreaders to facilitate dispersing the vibrational loading across an increased surface area of the flanges. However, known load-spreaders are generally aligned entirely parallel to the flanges and their respective mating surfaces. As a result, over time when exposed to compression loading, such flanges may still slip between the load-spreader and the mating surface, resulting in fastener pull out.

BRIEF SUMMARY OF THE INVENTION

In one aspect, a method for assembling a turbine engine casing is provided. The method includes positioning a first casing section radially outward from a turbine engine, wherein the first casing includes a first flange having an outer end portion, an inner end portion, and a body therebetween, at least a portion of the outer end portion has a partial frusto-conical cross-sectional profile. The method also includes positioning a second casing section including a second flange adjacent the first casing section such that a mating surface of the second flange is positioned substantially flush against a mating surface of the first flange, wherein each mating surface is positioned opposite a respective load-bearing surface of each flange. In addition, the method includes inserting at least one fastener through an opening in the first and second flanges to couple the second casing section to the first casing section such that a portion of a load-bearing surface extending over the first flange outer end portion facilitates distributing loading induced by the at least one fastener substantially equally across the load bearing surface.

In another aspect, a coupling assembly for a gas turbine engine is provided. The coupling assembly includes a first flange, a second flange, and a fastener. The first flange includes an outer end portion, an inner end portion, and a body portion extending therebetween. The outer end portion extends from an end surface to the body portion. The first flange also includes a mating surface, an opposite load bearing surface, and an opening extending therebetween. The load bearing surface extends from the end surface over the outer end portion, the body portion, and the inner end portion. At least one of the outer end portion and the inner end portion comprises a partial frusto-conical cross-sectional shape such that a portion of the load bearing surface extending over the end portion extends obliquely from the body portion load bearing surface. The second flange includes a mating surface, an opposite load bearing surface, and an opening extending therebetween. The fastener is sized for insertion through the first flange opening and the second flange opening. The fastener is configured to secure the first flange to the second flange such that the first flange mating surface is substantially flush against the second flange mating surface. The obliquely aligned portion of the load bearing surface is configured to distribute loading induced by the fastener substantially equally across the load bearing surface.

In a further aspect, a turbine engine assembly is provided. The turbine engine assembly includes a turbine engine, an engine casing, and at least one fastener. The engine casing includes a first casing section and a second casing section. The first casing section includes a first flange having an outer end portion, an inner end portion, and a body portion extending therebetween. The outer end portion extends from an end surface to the body portion. The first flange also includes a mating surface, an opposite load bearing surface, and an opening extending therebetween. The load bearing surface extends from the outer end over the outer end portion, the body portion, and the inner end portion. At least one of the outer end portion and the inner end portion has a partial frusto-conical cross-sectional shape such that a portion of the load bearing surface extending over that end portion extends obliquely from the body portion load bearing surface. The second casing section includes a second flange comprising a mating surface, an opposite load bearing surface, and an opening extending therebetween. The at least one fastener is sized for insertion through the first flange opening and the second flange opening for coupling the first casing section to the second casing section such that the casing extends substantially circumferentially around the turbine engine. The fastener is configured to secure the first flange to the second flange such that the first flange mating surface is substantially flush against the second flange mating surface and such that the obliquely aligned portion facilitates distributing loading induced by the fastener substantially equally across the load bearing surface.

DETAILED DESCRIPTION OF THE INVENTION

Figure 1:
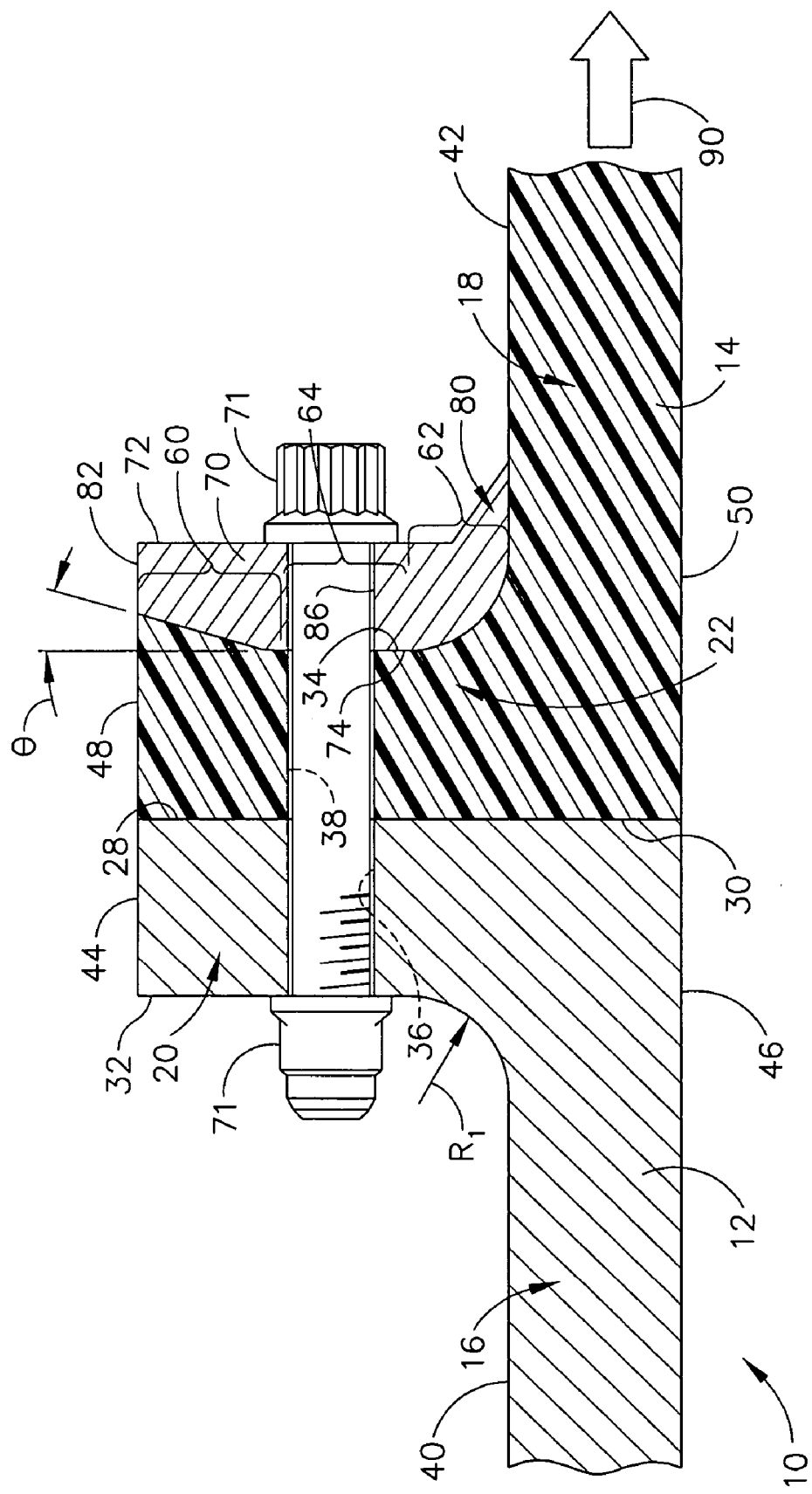
FIG. 1 is a side view of an exemplary coupling assembly that may be used to couple a pair of components together.

FIG. 1 is a side view of an exemplary embodiment of a coupling assembly 10 that may be used to fasten a pair of components 12 and 14 together. In the exemplary embodiment, components 12 and 14 are casing sections coupled together for use with a turbine engine assembly (not shown). Coupling assembly 10 is not limited to being used with turbine casing components 12 and 14, but rather coupling assembly 10 may be used to couple any adjacent components together as described herein. Accordingly, the specific size, shape, and configuration of coupling assembly 10, as described and/or illustrated herein, is exemplary only.

Accordingly, the specific size, shape, and/or configuration of coupling assembly 10 generally, as well as portions thereof, may be selected to accommodate other components than engine casing sections 12 and 14. In the exemplary embodiment, component 14 is fabricated from a composite material.

In the exemplary embodiment, each component 12 and 14 includes a respective casing body 16 and 18, and a respective flange 20 and 22. In the exemplary embodiment, each flange 20 and 22 extends substantially perpendicularly outward from each respective casing body 16 and 18. Alternatively, depending on the application of coupling assembly 10, each flange 20 and 22 may be oriented at any angle relative to each respective casing body 16 and 18, or may extend from any other component, that enables coupling assembly 10 to function as described herein.

In the exemplary embodiment, component 12 and 14 are annular structures and accordingly, each flange 20 and 22 extends circumferentially around each respective component 12 and 14. More specifically, in the exemplary embodiment, flanges 20 and 22 are generally mirror images of each other, with the differences being described herein. As such, each flange 20 and 22 includes a respective mating surface 28 and 30 and an oppositely disposed load bearing surface 32 and 34, respectively. In the exemplary embodiment, at least a portion of mating surface 28 and 30 is substantially parallel to at least a portion of each respective loading surface 32 and 34, as described herein. Each flange also includes an opening 36 and 38, respectively, extending therethrough between each respective mating surface 28 and 30 and each load bearing surface 32 and 34.

Each flange 20 and 22 extends from an end of each component 12 and 14 such that each mating surface 28 and 30 defines an end surface of each component 12 and 14. Moreover, in the exemplary embodiment, the intersection between each load bearing surface 32 and 34 and the outer surface 40 and 42 of each respective component 12 and 14 is formed with the same radius of curvature $R_1$.

In the exemplary embodiment, flange 20 has a generally rectangular cross-sectional profile and is formed such that mating surface 28 extends from an end surface 44 of flange 20 to an inner surface 46 of component 12. Moreover, in the exemplary embodiment, mating surface 28 is substantially parallel to load bearing surface 32, and opening 36 is oriented substantially perpendicularly to surfaces 28 and 32. Similarly, mating surface 30 extends from an end surface 48 of flange 22 to an inner surface 50 of component 14, and is substantially perpendicular to component inner surface 50.

Flange 22 is formed with an outer end portion 60, an inner end portion 62, and a body portion 64 extending integrally therebetween. Accordingly, inner end portion 62 is formed integrally between flange body portion 64 and casing body 18. In the exemplary embodiment, flange body portion 64 has a substantially rectangular cross-sectional profile, and as such, within flange body portion 64, load bearing surface 34 is substantially parallel to mating surface 30.

In the exemplary embodiment, flange outer end portion 60 has a partial frusto-conical or partial dovetailed cross-sectional profile. As such, that portion of load bearing surface 34 extending over end portion 60 is aligned obliquely at an angle θ (measured with respect to mating surface 30) with respect to those portions of load bearing surface 34 extending over flange body portion 64 and flange inner end portion 62. Specifically, in the exemplary embodiment, angle θ is equal to approximately 8°.

Coupling assembly 10 also includes a load-spreader or backer plate 70 and a fastener 71. In the exemplary embodiment, load-spreader 70 is a separate component that is coupled within coupling assembly 10. Alternatively, load-spreader 70 may be formed integrally with component 14. Load-spreader 70 includes a load bearing surface 72 and an oppositely-disposed mating surface 74. In the exemplary embodiment, mating surface 74 is contoured with a shape that substantially mirrors that of flange load bearing surface 34. Accordingly, when load-spreader 70 is positioned adjacent coupling flange 22, mating surface 74 is positioned substantially flush against flange load bearing surface 34.

To facilitate enhanced structural support and load distribution qualities, as described in more detail below, an inner end portion 80 of load-spreader 70 is also formed with a partial frusto-conical or partial dovetailed profile. Accordingly, within inner end portion 80, load bearing surface 72 is oriented obliquely with respect to the remainder of load bearing surface extending from inner end portion 80 to an end surface 82 of load-spreader 70. More specifically, with the exception of within inner end portion 80, load-spreader load bearing surface 72 is substantially parallel to flange mating surfaces 28 and 30, as well as that portion of load bearing surface 34 defined by flange body portion 64.

In the exemplary embodiment, fastener 71 is a threaded bolt and nut assembly that is sized to be inserted through an opening 86 defined in load-spreader 70 as well as flange openings 36 and 38. More specifically, during use, initially, component 12 is positioned adjacent to component 14 such that flange 20 is adjacent to flange 22. Mating surfaces 28 and 30 are pressed into contact and load-spreader 70 is positioned adjacent flange 22. As fastener 71 is tightened, component 12 is securely coupled to component 14, such that load-spreader load bearing surface 72 load-spreader load bearing surface 72 is substantially parallel to flange mating surfaces 28 and 30. More specifically, the partial dovetail shape of flange outer end portion 60 in combination with the complimentary shape of load-spreader 70 facilitates distributing loading induced by fastener 71 substantially evenly across load-spreader 70. Thus loading induced to flange 22 is also facilitated to be distributed substantially evenly across flange 22.

The combination of the complimentary shapes of flange outer end portion 60 and of load-spreader 70 also facilitate preventing fastener pull out. Specifcially, when subjected to loading (indicated as an arrow 90) the complimentary shapes of flange outer end portion 60 in combination with the complimentary shape of load-spreader 70 prevent flange 22 from being pulled or straightened without compressing the composite flange 22 between flange 20 and load-spreader 70. Because the compression capability of the composite flange 22 is greater than the frictional resistance between mating surfaces 28 and 30, the forces required to fail the coupling between flanges 20 and 22 is facilitated to be increased. As a result, the combination of the shape of flange outer end portion 60 and load-spreader 70 facilitate increasing a useful life of components 12 and 14. Moreover, the combination of the shape of flange outer end portion 60 and load-spreader 70 facilitates increasing the overall strength of flange 22 such that less material may be used to provide the same strength, and as such, weight savings may be realized.

Figure 2:
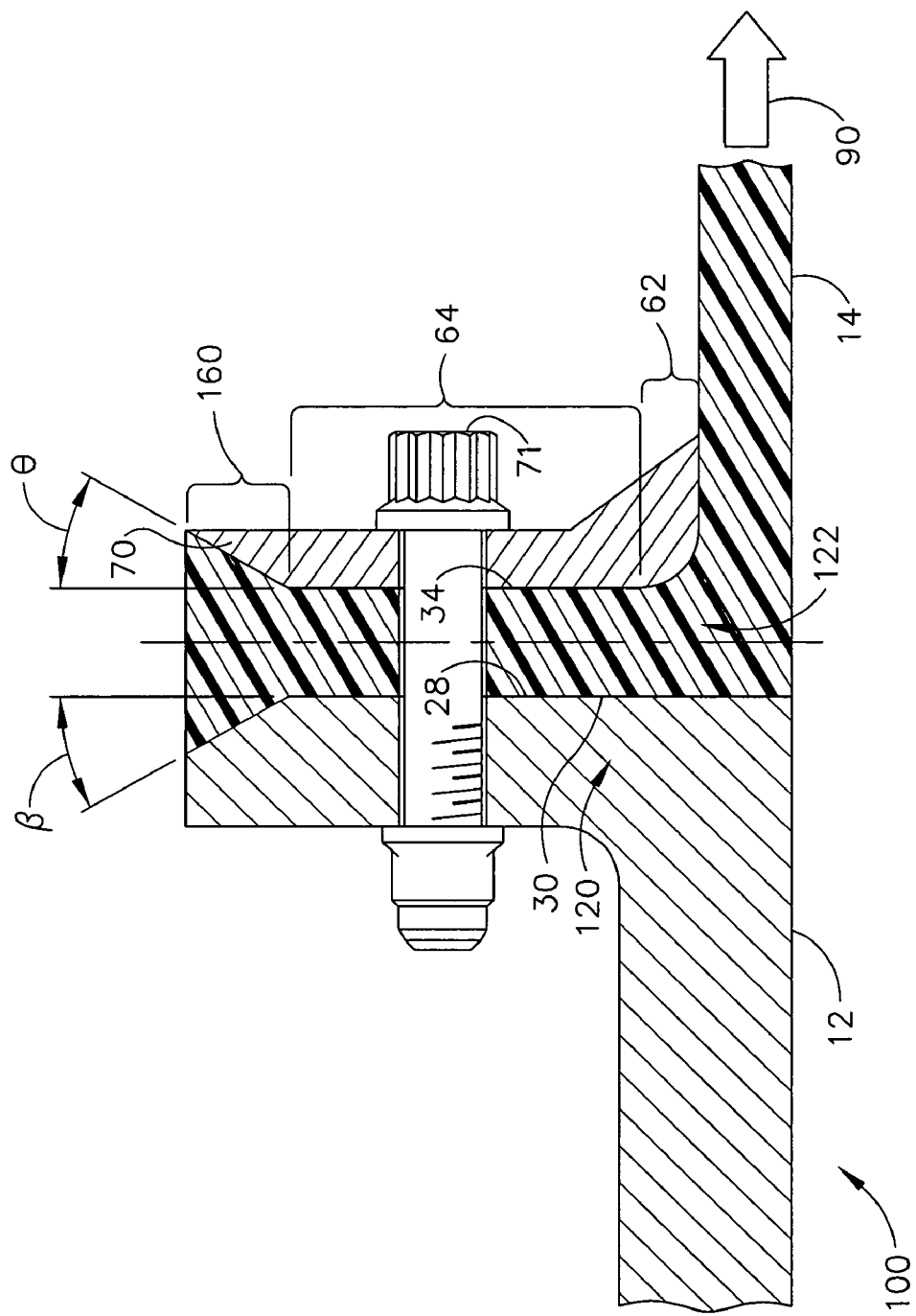
FIG. 2 is a side view of alternative embodiment of a coupling assembly that may be used to couple a pair of components together.

FIG. 2 is a side view of alternative embodiment of a coupling assembly 100 that may be used to couple components 12 and 14 together. Coupling assembly 100 is substantially similar to coupling assembly 10, shown in FIG. 1, and components in coupling assembly 100 that are identical to components of coupling assembly 10 are identified in FIG. 2 using the same reference numerals used in FIG. 1. Accordingly, coupling assembly 100 is used to couple a pair of components together, such as components 12 and 14.

Within coupling assembly 100, component 12 includes a flange 120 and component 14 includes a flange 122. Flange 122 extends from an end of component 14 and includes an outer end portion 160 that is formed integrally with inner end portion 62 and body portion 64. Outer end portion 160 has a frusto-conical or dovetailed cross-sectional profile that is at least partially defined by flange mating surface 30 and by flange load-bearing surface 34. Specifically, similarly to flange outer end portion 60 (shown in FIG. 1), the portion of flange load-bearing surface 34 extending over outer end portion 160 is aligned obliquely at angle θ, with respect to mating surface 30.

Similarly, the portion of flange mating surface 30 extending over outer end portion 160 is aligned obliquely at an angle β measured with respect to mating surface 30. In the exemplary embodiment, outer end portion 160 is symmetric about a center line axis of symmetry $C_L$ such that angle β and angle θ each extend for the same number of degrees but in opposite orientations with respect to each other.

Accordingly, to enable flange 120 to mate substantially flush against flange 122, within coupling assembly 100 flange 120 includes an outer end portion 164 that is tapered with a contoured shape that substantially mirrors that of flange outer end portion 160.

The complimentary shapes of flanges 120 and 122, in combination with the complimentary shapes of flange 122 and load-spreader 70 facilitate preventing fastener 71 pull out. Specifically, when subjected to loading 90, the complimentary shapes of flanges 120 and 122, in combination with the complimentary shapes of flange 122 and load-spreader 70 facilitate preventing flange 122 from being pulled or straightened without compressing the composite flange 122 between flange 120 and load-spreader 70. Because the compression capability of composite flange 122 is greater than the frictional resistance between mating surfaces 28 and 30, the forces required to fail the coupling between flanges 120 and 122 is facilitated to be increased. As a result, the combination of the shape of flange outer end portion 160 and flange 120 facilitates increasing the overall strength of flange 122 such that less material may be used to provide the same strength, and as such, weight savings may be realized.

Figure 3:
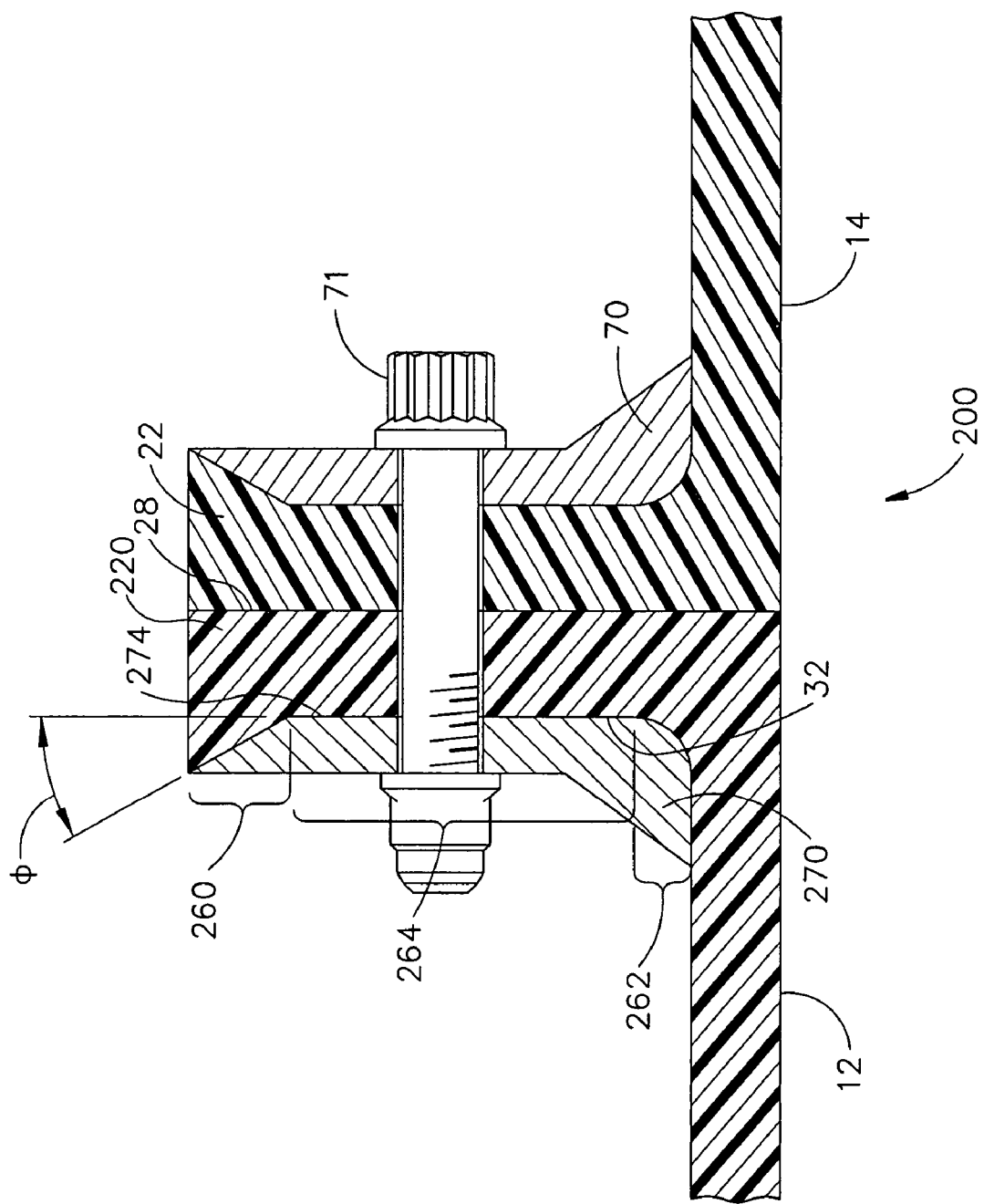
FIG. 3 is a side view of a further alternative embodiment of a coupling assembly that may be used to couple a pair of components together.

FIG. 3 is a side view of an alternative embodiment of a coupling assembly 200 that may be used to that may be used to couple a pair of components, such as components 12 and 14, together. Coupling assembly 200 is substantially similar to coupling assembly 10, shown in FIG. 1, and components in coupling assembly 200 that are identical to components of coupling assembly 10 are identified in FIG. 3 using the same reference numerals used in FIG. 1. Accordingly, component 14 includes flange 22 and coupling assembly 200 also includes fastener 71 and load-spreader 70.

Within coupling assembly 100, component 12 includes a flange 220 that extends from an end of component 12. Flange 220 is substantially similar to flange 22 and in the exemplary embodiment, is a mirror image of flange 22. Accordingly, flange 220 includes an outer end portion 260 that is formed integrally with an inner end portion 262 and a body portion 264 that extends between outer end portion 260 and inner end portion 262. Flange outer end portion 260 has a partial frusto-conical or partial dovetailed cross-sectional profile. As such, that portion of load bearing surface 32 extending over end portion 260 is aligned obliquely at an angle Φ (measured with respect to mating surface 28) with respect to those portions of load bearing surface 32 extending over flange body portion 264 and flange inner end portion 262.

In addition, coupling assembly 200 includes a second load-spreader 270 that is substantially similar to, and in a mirrored relationship with, load-spreader 70. Accordingly, a load-bearing surface 274 of load-spreader 270 is contoured with a shape that substantially mirrors that of flange load-bearing surface 32. Accordingly, when flange 220 is positioned adjacent load-spreader 270, load bearing surface 274 is positioned substantially flush against load bearing surface 32.

Figure 4:
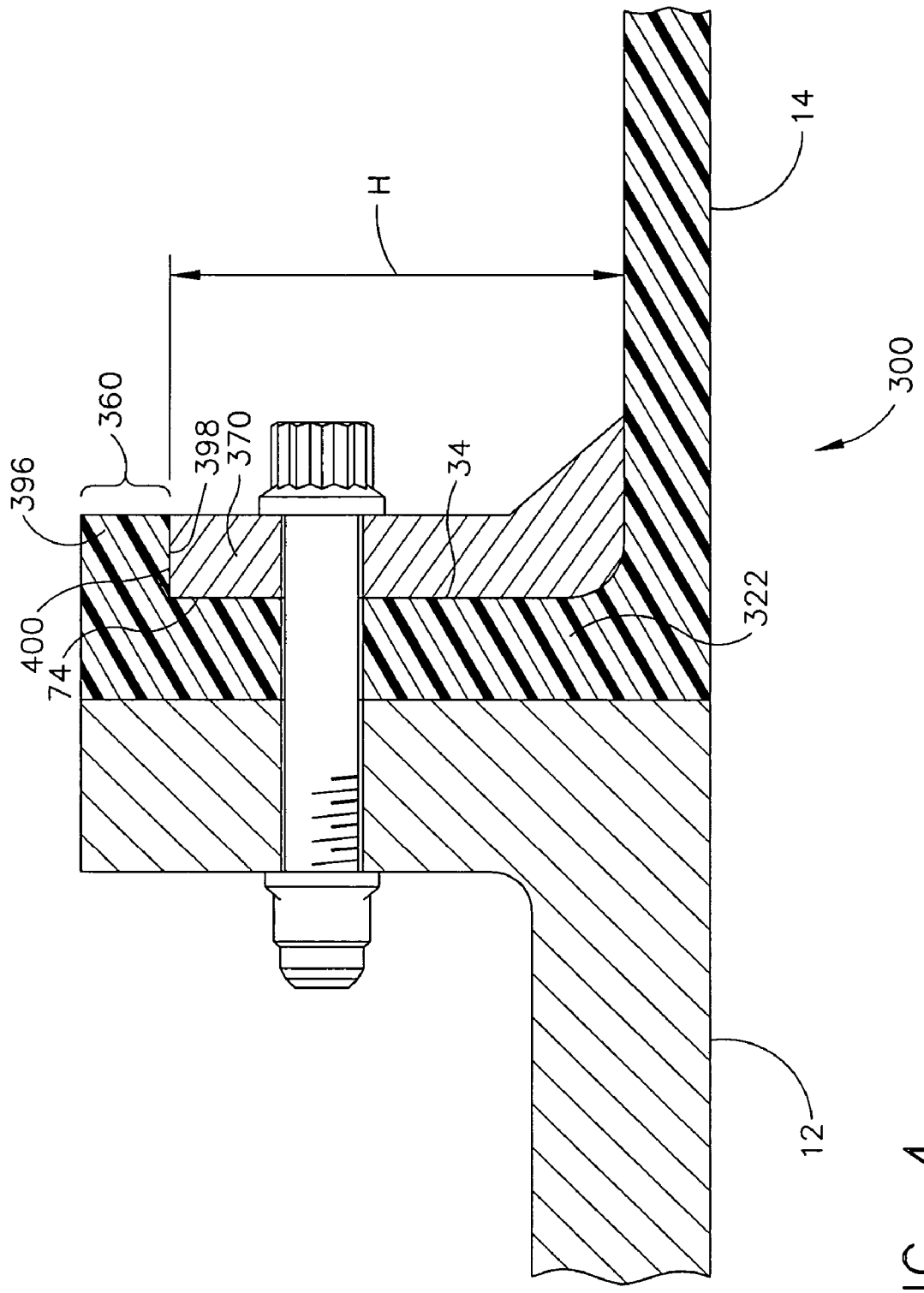
FIG. 4 is a side view of another embodiment of a coupling assembly that may be used to couple a pair of components together.

FIG. 4 is a side view of alternative embodiment of a coupling assembly 300 that may be used to that may be used to couple components 12 and 14 together. Coupling assembly 300 is substantially similar to coupling assembly 10, shown in FIG. 1, and components in coupling assembly 300 that are identical to components of coupling assembly 10 are identified in FIG. 4 using the same reference numerals used in FIG. 1. Accordingly, coupling assembly 300 is used to couple components 12 and 14 together.

In the exemplary embodiment, flange 322 outer end portion 360 includes a rabbitted surface 396 that extends substantially perpendicularly outward from flange load bearing surface 34. Mating surface 74 has a height H that is sized to enable surface 396 to extend above load-spreader 370. Accordingly, when flange 322 is positioned adjacent load-spreader 370, a lower surface 398 of surface 396 is positioned substantially flush against an upper surface 400 of load-spreader 370.

Exemplary embodiments of a fastener pull out prevention are described above; however the fastener pull out prevention is not limited to the specific embodiments described herein. While the invention has been described in terms of various specific embodiments, those skilled in the art will recognize that the invention can be practiced with modification within the spirit and scope of the claims.

What is claimed is:

1. A coupling assembly comprising:
a first flange formed integrally with a first adjacent component to be coupled, said first flange comprising a first mating surface, a first load bearing surface opposite said first mating surface, and a first opening extending from said first mating surface to said first load bearing surface, said first load bearing surface comprising an inner end portion, a body portion, and an outer end portion, wherein said outer end portion comprises a partial frusto-conical cross-sectional shape such that said outer end portion extends obliquely from said body portion, said inner end portion comprising an arcuate cross-sectional shape such that said inner end portion extends arcuately from said body portion;
a second flange formed integrally with a second adjacent component to be coupled, said second flange comprising a second mating surface, a second load bearing surface opposite said second mating surface, and a second opening extending from said second mating surface to said second load bearing surface;
a load spreader comprising a spreader load bearing surface, a spreader mating surface opposite said spreader load bearing surface, and a spreader opening extending from said spreader load bearing surface to said spreader mating surface, said load spreader configured to be coupled to said first flange such that said first load bearing surface is substantially flush against said spreader mating surface, said load spreader comprising an inner end portion that extends axially to, in an oblique angle, said load bearing surface and circumscribes said first adjacent component; and
a fastener sized for insertion through said first opening and said second opening, said fastener configured to secure said first flange to said second flange such that said first mating surface is substantially flush against said second mating surface, said outer end portion configured to distribute a load induced by said fastener substantially uniformly across said first load bearing surface.

2. A coupling assembly in accordance with claim 1 wherein at least one of said first flange and said second flange comprises a composite material.

3. A coupling assembly in accordance with claim 1 wherein said load spreader further comprises a spreader outer end portion, a spreader inner end portion, and a spreader body portion extending from said spreader outer end portion to said spreader inner end portion, wherein said spreader inner end portion comprises a frusto-conical cross-sectional shape.

4. A coupling assembly in accordance with claim 1 wherein said first adjacent component comprises an annular casing surrounding a rotatable member.

5. A coupling assembly in accordance with claim 1 wherein said first adjacent component comprises a turbine casing.

* * * * *